United States Patent Office 3,365,932
Patented Jan. 30, 1968

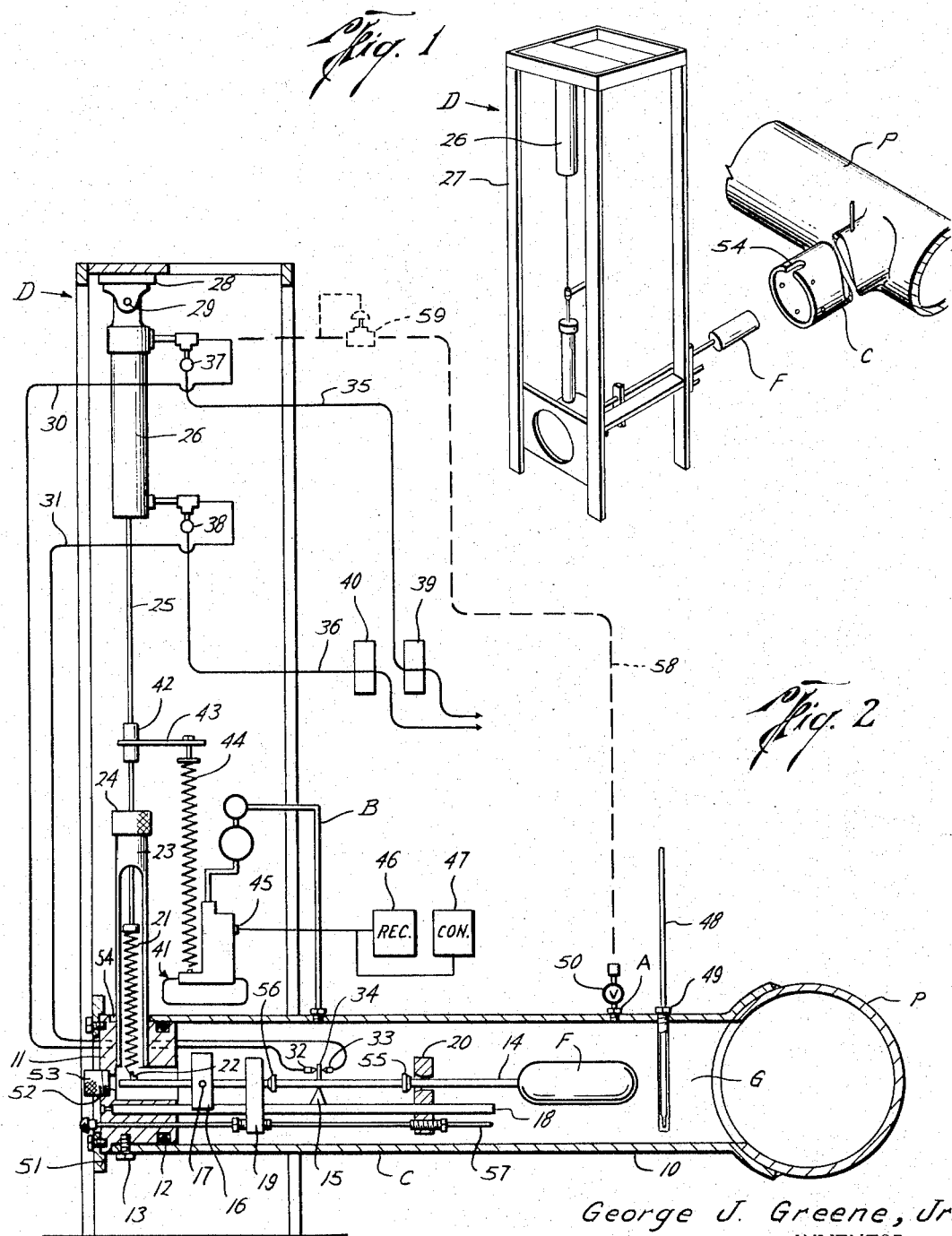

3,365,932
DENSITOMETER
George J. Greene, Jr., Shreveport, La., assignor to
UGC Instruments, Inc., Houston, Tex., a corporation of Delaware
Filed Aug. 16, 1965, Ser. No. 479,884
10 Claims. (Cl. 73—30)

ABSTRACT OF THE DISCLOSURE

A float densitometer having a pressure chamber with a resiliently biased float mounted therein and an external pressure responsive means controlled by the position of the float and connected to the resilient biasing means to vary the biasing of the float. This abstract is neither intended to define the invention of the application which, of course, is measured by the claims, nor is it intended to be limiting as to the scope of the invention in any way.

---

The present invention relates to an improved apparatus for measuring the density of a gas and to providing a continuous indication of or output signal proportional to such density.

An object of the present invention is to provide an apparatus for measuring the density of a gas in which the gas being measured is used to provide a feedback signal to the density sensing means.

Another object of the present invention is to provide a buoyancy means for sensing the density of a gas and using the gas to actuate a pressure responsive means responsive to the position of the buoyancy means with reference to a neutral position to exert a restoring force on the buoyancy means.

Another object of the present invention is to provide a buoyancy type of density measuring apparatus for a gas under pressure in which gas is conducted into a chamber under pressure and a portion of the gas in the chamber is utilized responsive to a movable density sensing means to provide a force on such density sensing means to counterbalance movement of such means.

A further object of the present invention is to provide a buoyancy-type gas densitometer utilizing the gas being measured to provide a movement of a pressure responsive means proportional to density; such movement being over a substantial distance providing greater accuracy and ease in recording and converting to a control signal.

Another object is to provide a buoyancy-type gas densitometer in which the density of the gas under pressure is sensed by movable buoyancy means within a chamber containing the gas under pressure and gas from the chamber is conducted to pressure responsive means responsive to the position of the buoyancy means, the positioning of such pressure responsive means being indicative of the sensed density and varying the force on the buoyancy means to counterbalance the buoyant force on said buoyancy means.

A further object is to provide an apparatus for measuring the density of gas under pressure utilizing the gas from the chamber to power pressure responsive means on the exterior of the chamber and mechanically connecting such means into the chamber to provide a feedback signal, the friction in such connection through the wall of the chamber being relatively high to seal against gas pressure without adversely affecting the operation of the feedback.

Still another object is to provide an apparatus for measuring density of a gas under pressure in a chamber having external pressure responsive means which has an output signal responsive to changes in density which is mechanically directed to the density sensing means in the chamber as a variable force counterbalancing the force changes developed by the density sensing means responsive to changes in density of the gas in the chamber.

Still a further object of the invention is to provide a buoyancy-type densitometer for measuring the density of a gas under pressure which overcomes the difficulty of transmitting a motion through the walls of a chamber containing the gas under pressure to counterbalance the change of forces on the density sensing means resulting from changes in the density of gas within the chamber.

These and other objects of the present invention are hereinafter set forth and explained in relation to the drawings wherein:

FIGURE 1 is an exploded perspective view of the apparatus of the present invention and its connection to a pipeline; and FIGURE 2 is a longitudinal sectional view of the apparatus of the present invention.

The apparatus of the present invention senses or measures the changes in density of a gas under pressure within a chamber with a density sensing means and includes a pressure responsive means which is actuated by gas from the chamber responsive to the position of the density sensing means which provides an output signal that may be calibrated to indicate the gas density directly therefrom and which also may be used as a feedback to provide a movement which is linked to the density sensing means to change a counterbalance force to return the density sensing means to its neutral or normal density change sensing position.

In the form of the invention illustrated in the accompanying drawings, the apparatus will measure changes in density of a gas under pressure as sensed by a buoyancy means. Buoyancy forces developed are in direct proportion to the density of the gas in which the buoyancy means is submerged. The buoyancy means is contained within a chamber which is adapted to contain the gas under pressure.

It would be desirable if the buoyancy means could be immersed in the gas to be measured at its source; e.g., within a gas pipeline. Since the buoyancy means is operated by the changes in buoyancy forces resulting from changes in gas density, it is necessary to protect the buoyancy means from turbulence and from impingement of the flowing gases directly on such means. Therefore, in the illustrated example, the buoyancy means is mounted in proximity to the source of flowing gas whose density is to be measured. It is preferred that the density measurements be of the gas at the same temperature as the gas flowing in the source to avoid having to make a temperature correction in the output of the densitometer. In the event that proximity between the densitometer buoyancy means and the gas source is not possible, then some provision should be made to assure that the gas being measured is the same as the source gas. This may be accomplished by inlet and outlet connections between the instrument and the source and suitable means to assure flow of gas through the instrument, such as mounting the instrument across a pressure drop in a pipeline source. It is further recommended that the chamber of the instrument be insulated to insulate against changes of temperature of the gas in the instrument.

The density sensing means used in the form of the invention illustrated is of the buoyancy type and is contained within a chamber adapted to hold the gas to be measured under pressure. This density sensing means or buoyancy means is illustrated in the drawing as the float member F. The float member F is made to have a substantial volume so as to allow the development of buoyant forces on the float responsive to changes of the density of the gas in the chamber. In actual operation of the densitometer of the present invention the changes in the density of the gas in the chamber which result in changes in the buoyant force on the float member R are utilized as a comparison to a previously set standard of gas density to provide an indication of the gas density, and the output of the device may also be used as a control signal; e.g., to control the mixing of gases to maintain a predetermined density of the resultant mixture.

The chamber C which contains the gas to be measured is sealed so that the gas may be contained under pressure. A suitable inlet is provided to connect to the source of gas to be measured and to allow the gas to be continually delivered from the source to the chamber. In the illustrated form this inlet G takes the form of a direct connection into the source which is the pipeline P. The connections A and B extending from the chamber C provide outlets for gas used in calibration of the instrument and also for gas to be used as a control medium in the other equipment associated with the instrument. The chamber C is defined by the barrel 10 which is secured to the pipeline P as by welding or other suitable means. The other end of the barrel 10 receives the block 11. Sealing means, O-ring 12, is provided to seal between the exterior of the block 11 and the interior of the barrel 10. The end of the barrel 10 is secured to the block 11 by screws 13.

The float member F to be responsive to changes in the buoyancy forces on it resulting from changes in density of the gas in chamber C must be mounted within the chamber C with suitable mounting means to allow the float member F to respond to such changes in forces even though they are relatively small. In the illustrated form the mounting means includes the beam 14 which is secured to the float member F and which is supported by the pivot support 15. The pivot support 15 is of any suitable type which allows free movement of beam 14 and does not have a restoring force. The function of the pivot support 15 is to provide support for the beam 14 about which the beam 14 may move relatively free of friction in response to changes in buoyancy forces on the float member F. The counterbalance weight 16 is mounted on the beam 14 and includes suitable means, such as the set screw 17, for securing it in any desired position on the beam 14. The counterweight 16 will have sufficient weight to counterbalance the weight of the float member F but will not have a volume which would develop sufficiently large buoyancy forces to interfere with the action of the changes in density on the float member F. The mounting means for the float member F also includes the mounting bar 18 on which the pivot support 15 and the caging blocks 19 and 20 are supported. The bar 18 is secured in the block 11.

A resilient biasing means, such as the spring 21, is associated with the support means so that when the float member F is moved responsive to a change in the buoyancy forces on the member resulting from a change in density of the gas being measured, the force exerted on the support means by the counterbalancing means may be varied to provide a restoring force to the float member F. In this way a very limited movement of the float member F will provide an indication of a change in the density of the gas in the chamber C and the restoring force of the spring 21 will be a measure of the change of the buoyancy forces on the float member F and also of the change in density. Also, since the force exerted by the spring is substantially linear to its extension, then the position of the end of the spring away from the end secured to the beam 14 will be proportional to the density of the gas. In the form shown the spring 21 is secured by a suitable clip 22 to the end of the beam 14 opposite to the float member F. The spring 21 extends upwardly within the tubular member 23 which is secured in pressure-tight relationship to the block 11. The other end of the tubular member 23 is provided with the packing gland 24 through which a connecting rod 25 extends to engage the end of spring 21.

A pressure responsive means, generally indicated at D, is provided with the present invention to respond to the movements of the float member F and to be actuated to provide a restoring force to the float member commensurate with the change in the buoyancy force on the float member F. The pressure responsive means illustrated is a double acting, gas actuated piston within the cylinder which is generally designated at 26. The connecting rod 25 connects to the piston and will move with the movement of the piston. The cylinder 26 is supported on the frame 27 by the mounting bracket 28 and the pin 29. The motive force for actuating the piston within the cylinder 26 is supplied by the gas from the chamber C. The gas from the chamber C is conducted to the two opposite ends of the cylinder 26 by the ducts 30 and 31. The inlets 32 and 33 of the ducts 30 and 31, respectively, within the chamber C have a nozzle shape and are controlled by a suitable valve means. Since one of the primary disadvantages of prior float-type density sensing devices is that they have a very limited amount of travel which limits the accuracy and increases the problems of providing an indication, it is preferred that the pressure responsive means D have a travel of a substantial length. In one device actually constructed, the piston had a travel of ten inches. The spring rate of the spring 21 will be selected to accommodate the long travel of the pressure responsive means D.

Valve means is used to control the flow of gas through the two ducts 30 and 31 in response to the position of the float member F. In this way the pressure responsive means will be actuated in response to the position of the float member F. The valve means as illustrated includes the flapper 34 which is mounted on the beam 14 at a position directly over the pivot support 15 and with the float member F in neutral position will be exactly midway between the nozzle ends of the inlets 32 and 33. The flapper 34 will therefore control the amount of gas flowing to the cylinder 26 through each of the ducts 30 and 31 in response to the position of the float member F. Thus, measurement of the float member F downwardly will cause the flapper 34 to close the inlet nozzle 33 and to leave the inlet nozzle 32 unrestricted. As float member F moves upwardly, the flapper 34 will close the inlet nozzle 32 and move away from the inlet nozzle 33, thereby controlling flow of gas from chamber C responsive to the position of the float member F.

In actual practice, the actuation of the pressure responsive means tends to return the beam and flapper to neutral position. The movement of the beam and flapper is relatively minute so that when sufficient restoring force is provided by the pressure responsive means to overcome the change in buoyancy and the force of the gas pressure holding the flapper on the nozzle, the flapper 34 will move to a position closing the opposite nozzle and will not stop or linger in a neutral position. This movement does not stop at a neutral or mid position since, as soon as both forces are overcome by the restoring force and the flapper moves slightly away from one nozzle inlet, the pressure force will not be exerted and the restoring force will be greater than is needed to restore the float member F and beam 14 to a neutral position. This force will move the beam 14 and float member F until the flapper 34 engages the opposite nozzle inlet. Such actual operations have found that the relatively small amount of cycling resulting from this movement does not destroy the accuracy of the density measurement but does provide an indication that the instrument is in operation and functioning in the expected manner.

Each of the ducts 30 and 31 is connected to exhaust ducts 35 and 36 through which the pressure from within the cylinder 26 is constantly exhausted through the regulators 37 and 38 and the flow meters 39 and 40. It should be noted that the restriction to flow in the exhaust lines 35 and 36 of the regulators 37 and 38 and the flow meters 39 and 40 should be greater than the restriction in the ducts 30 and 31 provided by the nozzle inlets 32 and 33 to allow sufficient flow to build up operating pressures within the pressure responsive means D. The flowmeters 39 and 40 may be of the rising ball or dart type which will provide a visual indication of the rate of flow through the exhaust lines at all times. The regulators 37 and 38 are of the type which produce a particular output pressure, for example, twenty pounds per square inch gauge, to be delivered to the flowmeters 39 and 40 without reflecting changes in the input pressure. The input pressure to the regulators at times when the flapper is off of the inlet nozzle will be the same as the pressure in the chamber C. The gas leaving the flowmeters 39 and 40 will normally be vented or conducted to a flare or other suitable disposal means.

Transducer means will be provided to have an output signal to indicate the position of the piston within the cylinder 26 and to be used as a control pressure for controlling the gas being measured. In the form illustrated a Moore Products Company of Springhouse, Pennsylvania Position Indicator, Model 74, is used as such transducer means. This device is indicated generally at 41. A supply of gas is provided to transducer 41 from the connection B. The connecting rod 25 is provided with a collar 42 and an arm 43 extending therefrom to connect to the spring 44. The other end of the spring 44 is connected to the transducer means 41. The output line 45 extending from the means 41 is connected to a suitable recorder 46 and a controller 47. The transducer means 41 will provide an output to the recorder 46 and the controller 47 in the range of pressure from 3 to 15 pounds per square inch proportional to the density of the gas in the chamber 1 and therefore to the density of the gas flowing through the pipeline P. The recorder 46 when properly calibrated may record the density of the gas directly. The controller 47 may be used as hereinbefore stated to control any function or operation which may be controlled in response to a measure of the density of the gas.

As a means of confirming that the temperature of the gas within the chamber C is the same as the temperature of the gas in the pipeline P, a thermometer 48 is positioned within the thermometer well 49 which extends into the chamber C.

The connection A into the chamber C is provided with a suitable shut off valve 50. The ducts 30 and 31 from the inlet nozzles 32 and 33 are shown schematically in FIGURE 2. These ducts extend through the block 11 so that the entire unit may be removed from the chamber C when the block 11 is removed therefrom. The block 11 is suitable mounted on the mounting plate 51 which is welded or otherwise suitably secured to the frame 27. The block also is provided with a recess 52 closed by the plug 53. The recess 52 is in alignment with the end of the beam 14 so that the spring 21 may be readily disengaged from the clip 22.

It should be noted that the barrel 10 is provided with a slot 54 which receives the tubular member 23 so that it may be removed from the unit with the assembly as shown in FIGURE 1. The O-ring seal 12 is positioned on the interior of the barrel 10 at a point spaced within the chamber from the inner end of the slot 54.

The caging blocks 19 and 20 are mounted in sliding engagement on the mounting bar 18 and also surround the beam 14. The inner surface of each of the cage blocks 19 and 20 immediately surrounding the beam 14 is provided with an outwardly flaring seat in which the plugs 55 and 56 which are secured on the beam 14 engage when it is desired to render the instrument inoperative or caged. This caging is actuated by rotation of the caging rod 57 which is threadedly engaged with caging blocks 19 and 20. Rotation of the caging rod 57 in one direction will cause the caging blocks 19 and 20 to move towards each other until the seats in the blocks are in engagement with the plugs 55 and 56 whereby the beam 14 will be held securely in an inoperative position. Uncaging is accomplished by rotation of the caging rod 57 in the opposite direction so that the caging blocks 19 and 20 will move away from each other and thereby become disengaged from the plugs 55 and 56 and allow the beam 14 and float member F to become operative.

It is contemplated that for different ranges of gas density a different spring 21 will have to be used, the selection of such spring 21 being determined by the summation of forces on the beam 14 around the pivot support 15 considering the approximate density of the gas to be measured so that the restoring force of spring 21 will be properly effective.

It is also contemplated that a single duct, such as the duct 32 having an inlet nozzle, may be conducted to the pressure responsive means provided that pressure responsive means is supplied with a reference force against which the fluid pressure from such duct would work to cause the pressure responsive means to be positioned and to exert a force through the spring 21 on the beam 14 responsive to the position of the beam 14. Such a reference force could be accomplished by utilizing the gas under pressure from the chamber C and reducing the pressure of the gas to a pressure which would provide the proper reference pressure for the pressure responsive means. The duct 58, shown in dashed lines and having the pressure reducing regulator 59 therein, as an example of such connection. This duct 58 will connect from the connection A and provide gas under pressure from chamber C to the upper end of the pressure responsive means D. The pressure reducing regulator 59 will reduce the gas pressure to a pressure than the pressure in chamber C but this gas pressure will be sufficiently high so that when it is delivered to the cylinder 26, the pressure in duct 31 will move the piston upwardly when the inlet 33 is open and will move the piston downwardly when the inlet 33 is closed by the flapper 34. Any other reference force in the pressure responsive means D may be used provided the means D will respond to provide the restoring force to the beam 14 in response to the opening and closing of the inlet 33 by the flapper 34.

In operation the instrument is assembled by providing the suitable connection to the source of gas and, as illustrated, by welding the barrel 10 to the pipeline P. Thereafter, the internal parts are inserted and secured within the chamber C. The chamber may be purged of air by removing the plug 53 from the recess 52. When the unit is ready to operate, it should be calibrated so that the output of the transducer means 41 will provide the recorder 46 with the proper signal to record the density of the gas directly. With proper connection, any change in density of the gas in the pipeline P will be immediately reflected within the chamber C and such change will change the buoyancy forces on the float member F. A change in the force will cause the float member F and the beam 14 to move about the pivot support 15.

A slight movement of the float member F and beam 14 will move flapper 34. Assuming for example, that the density of the gas within the pipeline P has increased, this increase will be reflected within the chamber C and will increase the buoyancy force on the float member F. The increase in force on float member F will create an unbalanced condition on the beam 14 which will lift the float member F moving the flapper into position covering the inlet nozzle 32. With the inlet nozzle 32 closed and the inlet nozzle 33 open, the flow of gas from the chamber C to the pressure responsive means D will be through the duct 31 only. The constant bleeding of the pressure from the cylinder 26 and the lines 30 and 31 by the exhaust lines 35 and 36 will cause the pressure in the upper end of the cylinder to drop, while the lower end of the cylinder 26 will remain under pressure. This creates an unbalance of pressure across the piston within the cylinder 26 causing it to move upwardly. The upward movement of the piston by connection of the rod 25 will move the upper end of spring 21 upwardly to thereby increase the upward force of the spring 21 on the end of beam. This force increase will tend to restore the beam to balanced condition, but, as explained, will have to be sufficient to overcome the pressure force on the flapper over the nozzle area. When such increase does overcome this pressure force, it will be too great to just restore the beam 14 to neutral position. Therefore, when sufficient force is developed by the movement of the upper end of the spring 21 to move the beam 14, it will be moved until the flapper 34 engages the nozzle inlet 33. This opens the inlet 32 and closes the inlet 33 changing the flow to the pressure responsive means to create a force unbalance on the piston within cylinder 26 to move it downwardly. The downward movement of the piston will move the end of spring 21 downwardly so that it exerts less force on the end of beam 14, and when the forces on the beam are developed to the point of restoring the beam 14 to a neutral position, the movement of beam 14 will be completely to the opposite with the flapper 34 closing the inlet nozzle 32 and moving away from the inlet nozzle 33.

The packing gland 24 must provide sufficient packing force to retain the gas under pressure within the chamber C when the connecting rod 25 is moving in response to the changes in density. The seal provided by the packing gland 24 against the rod 25 will exert a considerable force against the rod, and such force will increase the frictional forces on the rod 25 resisting its movement. It is a particular advantage of the present invention that these frictional forces which are relatively high do not affect the movement of the rod 25 since any resistance against its movement will ultimately be overcome. These frictional forces on the rod 25 are overcome because the beam 14, the flapper 34 and the exhausting of one side of the cylinder will continue until the piston moves or until the full pressure differential of the pressure of the gas within the chamber C is exerted across the piston within the cylinder 26. The development of this full pressure differential is not usually needed, but it is available with the present invention if at any time the frictional forces on the rod 25 build up to the extent where such large pressure differential is necessary.

The movement of the pressure responsive means is in response to the position of the flapper 34, the beam 14, the float member F and, therefore, the density of the gas within the chamber C. The position of the connecting rod 25 will be in proportion to the amount of restoring force supplied by the spring 21 to the beam 14. This position is therefore proportional to the buoyancy forces and the density of the gas in the chamber. The movement of the arm 43 by its connection through the collar 42 to the connecting rod 25 will be transmitted to the transducer means 41 by the spring 44. This device, as explained, is suitable to convert the position of the arm 43 to an output signal which is proportional to the density of the gas and which may be delivered to the recorder 46 to directly record the density of the gas within the chamber C and the pipeline P, and also may be conducted to a controller 47 which may be used to control a mixing valve or other suitable device to control a process or an operation responsive to the density of the gas flowing within the pipeline P at the point at which the device of the present invention is connected.

The movement of the connecting rod 25 is over a relatively short distance while the density of the gas within chamber C remains the same, but when the density changes, the movement of rod 25 will be substantial in comparison to the movement of float operated torque tube devices. With this substantial movement, the accuracy of measurement and ease of converting this movement into an indication or a control signal is greatly simplified as compared to other much smaller movements.

From the foregoing it is clear that the present invention provides an apparatus for determining the density of gas under pressure of the buoyancy type which utilizes a portion of the gas being measured to provide an indication of the density and also as a feedback signal responsive to the position of the density sensing means to restore such means to its opposite position. The transmission of this feedback signal as a movement through a sealing connection is not deterred by the high frictional forces developed by such sealing connection since sufficient power is available in the apparatus to overcome such high frictional forces. The apparatus is sensitive to small density changes and provides a high degree of accuracy of measurement of gas density. The movement from which the indication of the density is taken is a substantial movement readily capable of being recorded and utilized to control some characteristic or factor in an operation.

What is claimed is:
1. A densitometer comprising,
a chamber adapted to contain a gas under pressure,
a connection into said chamber for conducting gas under pressure into said chamber,
buoyancy means movable in response to changes in density of the gas in the chamber,
means mounting said buoyancy means within said chamber for said movement including resilient means biasing said buoyancy means in one direction,
a conduit having an inlet within said chamber,
valve means controlling flow of gas through said inlet in response to the position of said buoyancy means,
pressure responsive means positioned outside said chamber exposed to a force on one side and pressure from said conduit on the other side and positioned thereby,
means extending into said chamber for connecting said pressure responsive means to the resilient means to change the biasing of said buoyancy means by said resilient means, and
means responsive to the position of said pressure responsive means providing an output indicative of the density of the gas in the chamber.

2. A densitometer comprising,
a chamber adapted to contain a gas under pressure,
a connection into said chamber for conducting gas under pressure into said chamber,
buoyancy means movable in response to changes in density of the gas in the chamber,
means mounting said buoyancy means within said chamber for said movement including resilient means biasing said buoyancy means in one direction,
a first conduit having an inlet within said chamber,
a second conduit having an inlet within said chamber,
valve means controlling flow of gas through said inlets in response to the position of said buoyancy means,
pressure responsive means positioned outside said chamber, exposed to the pressure from said first conduit on one side and to the pressure from said second conduit on the other side and positioned thereby,
means extending into said chamber for connecting said pressure responsive means to the resilient means to change the biasing of said buoyancy means by said resilient means, and
means responsive to the position of said pressure responsive means providing an output indicative of the density of the gas in the chamber.

3. A densitometer comprising,
a chamber adapted to contain a gas under pressure,
an inlet into said chamber for conducting gas under pressure into said chamber,
an outlet from said chamber,
a buoyancy member within said chamber,
a beam member secured to said buoyancy member,
a pivotal support for said beam member,
a spring engaging said beam member,
a cylinder,
a piston within said cylinder,
a rod connecting from said piston to said spring,
a first duct having an inlet and extending from within said chamber to said cylinder to deliver gas to power said piston in one direction,
a second duct having an inlet within said chamber and extending to said cylinder to deliver gas to power said piston in the other direction, a valve member on said beam member adapted to close the inlet of said first duct when said buoyancy member is moved to one position and adapted to close the inlet of said second duct when said buoyancy member is moved to the opposite position, said piston acting responsive to pressure of gas delivered to said cylinder from said chamber to cause said spring to exert an increased or decreased restoring force on said beam responsive to an increase or decrease of the buoyant force of the fluid on said buoyancy member, an indicating device connected to said rod to indicate the density of fluid in said chamber, and means connecting to said cylinder to provide a controlled bleeding of fluid pressure from said cylinder on both sides of said piston.

4. A densitometer comprising,
a chamber adapted to contain a gas under pressure,
an inlet into said chamber for conducting gas under pressure into said chamber,
an outlet from said chamber,
a buoyancy member within said chamber,
a beam member secured to said buoyancy member,
a pivotal support for said beam member,
a spring engaging said beam member,
a cylinder,
a piston within said cylinder,
a rod connecting from said piston to said spring,
an adjustable counterweight on said beam to counterbalance said buoyancy member,
a first duct having an inlet and extending from within said chamber to said cylinder to deliver gas to power said piston in one direction,
a second duct having an inlet within said chamber and extending to said cylinder to deliver gas to power said piston in the other direction,
a valve member on said beam member adapted to close the inlet of said first duct when said buoyancy member is moved to one position and adapted to close the inlet of said second duct when said buoyancy member is moved to the opposite position,
said piston acting responsive to pressure of gas delivered to said cylinder from said chamber to cause said spring to exert an increased or decreased restoring force on said beam responsive to an increase or decrease of the buoyant force of the fluid on said buoyancy member,
an indicating device connected to said rod to indicate the density of fluid in said chamber, and
means connecting to said cylinder to provide a controlled bleeding of fluid pressure from said cylinder on both sides of said piston.

5. A densitometer according to claim 1, wherein said pressure responsive means has a substantially long travel response to pressure changes in said conduit, and said connecting means includes a sealed connection.

6. A densitometer according to claim 1, including an exhaust line connected to said conduit and adapted to continuously bleed gas from said conduit.

7. A densitometer according to claim 1, including means responsive to the position of said pressure responsive means for providing an output indicative of the density of the gas in the chamber.

8. A densitometer according to claim 2, wherein said pressure responsive means has a substantially long travel response to pressure changes in said conduit, and said connecting means includes a sealed connection.

9. A densitometer according to claim 2, including a first exhaust line connected to said first conduit and adapted to continuously bleed gas from said first conduit, and a second exhaust line connected to said second conduit and adapted to continuously bleed gas from said second conduit.

10. A densitometer comprising,
a chamber adapted to contain gas under pressure,
a connection into said chamber for conducting gas under pressure into said chamber,
buoyancy means,
means mounting said buoyancy means within said chamber for movement in response to changes in density of the gas in said chamber,
resilient means within said chamber for biasing said buoyancy means in one direction,
pressure responsive means positioned outside of said chamber,
a connecting rod extending into said chamber for connecting said pressure responsive means to said resilient biasing means,
conduit means for conducting fluid under pressure to said pressure responsive means,
valve means controlling flow of fluid through said conduit means in accordance with the position of said buoyancy means whereby actuation of said pressure responsive means is transmitted to said biasing means within said chamber to vary the biasing of said buoyancy means, and
means responsive to the position of said pressure responsive means providing an output indicative of the density of the gas in said chamber.

References Cited

UNITED STATES PATENTS 2,459,542   7/1944   Rosenberger _____ 73—30

RICHARD C. QUEISSER, *Primary Examiner.*

J. D. SCHNEIDER, *Assistant Examiner.*